United States Patent
Abbott et al.

(10) Patent No.: US 6,516,021 B1
(45) Date of Patent: Feb. 4, 2003

(54) GLOBAL POSITIONING SYSTEMS AND INERTIAL MEASURING UNIT ULTRATIGHT COUPLING METHOD

(75) Inventors: Anthony S. Abbott, Rancho Palos Verdes, CA (US); Walter E. Lillo, Hermosa Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/396,105

(22) Filed: Sep. 14, 1999

(51) Int. Cl.[7] .................................................. G01S 11/00
(52) U.S. Cl. ........................ 375/150; 342/108; 342/189
(58) Field of Search .................................. 375/149, 150, 375/343, 350, 367; 842/108; 701/7, 214, 215; 342/189, 108

(56) References Cited

U.S. PATENT DOCUMENTS 5,532,697 A * 7/1996 Hidaka et al. ............... 342/104
5,909,189 A * 6/1999 Blackman et al. ............ 342/90
6,456,827 B1 * 9/2002 Kubo et al. .................... 455/68

* cited by examiner

Primary Examiner—Don N. Vo
Assistant Examiner—Dung X. Nguyen
(74) Attorney, Agent, or Firm—Derrick Michael Reid

(57) ABSTRACT

An ultratight coupling method generates navigation error state information from an integration Kalman filter for updating the navigation solution based upon inertial measurement data and computes pseudorange and pseudorange rate data from the navigation solution and from ephemeris data, to generate the prompt, early and late replica signals that drive the signal correlators having quadrature outputs samples by a federation of Kalman prefilters providing errors residuals to the integration Kalman filter in a closed coupled tracking loop. The coupled tracking loops offer improved tracking of the received signal based upon updated navigation solution.

19 Claims, 5 Drawing Sheets

NAVIGATION PROCESSOR

GPS INERTIAL NAVIGATION SYSTEM

NAVIGATION PROCESSOR

SINGLE FREQUENCY KALMAN PRE-FILTER

DUAL FREQUENCY KALMAN PRE-FILTER

PSEUDORANGE PRE-FILTER ERROR ESTIMATION

GLOBAL POSITIONING SYSTEMS AND INERTIAL MEASURING UNIT ULTRATIGHT COUPLING METHOD

STATEMENT OF GOVERNMENT INTEREST

The invention was made with Government support under contract No. F04701-93-C-0094 by the Department of the Air Force. The Government has certain rights in the invention. This method is on the Military Critical Technology List and is subject to export control.

FIELD OF THE INVENTION

The invention relates to the fields of communications and navigation systems. More particularly, the present invention relates to communication systems coupled to inertial navigation systems for improved signal tracking.

BACKGROUND OF THE INVENTION

With the increasing dependency on the Global Positioning System (GPS) for military and civilian navigation systems, it is important that the navigation receiver be able to withstand intentional or unintentional signal interference with robust signal acquisition and tracking. For this reason, inertial navigation systems have been coupled to GPS signal tracking and acquisition system for improved signal tracking and acquisition of the received signal. Inertial navigation systems (INS) have an inertial measurement unit (IMU) for processing inertial measurements. Coupling navigation data with the GPS signal tracking and acquisition system improves signal tracking and acquisition. When the inertial measurements of a navigation processor are used with a GPS signal tracking and acquisition system, the combined system is said to be tightly coupled. The tightly coupled GPS and INS method uses pseudorange and pseudorange rate measurements from the GPS receiver instead of the processed position and velocity measurements. In addition, inertial measurement unit data is usually used to assist the receiver tracking loops and enable more noise filtering than would be possible without tracking loop aiding. The tightly coupled method has been used with the pseudorange and pseudorange rate measurements. The receiver measurements are not the raw receiver correlator samples, but the product of aided or unaided receiver tracking loops and are subject to performance limitations.

A loosely coupled GPS and INS method has an integration Kalman filter used to process GPS position and velocity measurements to aid the inertial navigation system. In a loosely coupled method, no information from the inertial navigation system is used to assist the tracking loops in the GPS receiver. The GPS receiver is unaided when the tracking loops must operate independently of the inertial navigation system. The loosely coupled method is easily jammed and has poor noise filtering.

A tracking loop is a combination of electronic hardware and software algorithms used to track a pseudorandom noise (PRN) code signal and its carrier. A tracking loop that tracks the PRN code is called the Code Loop and one that tracks the carrier is called the Carrier Loop. The Carrier Loop can track the phase or the frequency of the carrier or a combination of both. A tracking loop design is adjusted to each application by designing the closed loop gains and the order of the filter to obtain the desired filtering and dynamic response. A code tracking loop functions by driving the code phase of a replica signal to be aligned with the received signal so as to enable coherent demodulation of the received signal. The tracking loops include a signal generator that generates an estimated replica signal of the received signal using a control signal that advances or retards in time the replica signal relative to the received signal, includes a correlator that multiplies the received signal by the replica signal and passes the multiplied signal result through a low pass filter, includes discriminator generator that generates a discriminator signal having a value related to the difference between the received signal and the replica signal, and includes a controller that filters the discriminating signal into the control signal that is then communicated to the signal generator.

A fundamental function in all GPS receivers built to date is the ability of the receiver to generate a replica signal of the received signal transmitted by a satellite that can be correlated with the received signal being received from the satellite. The replica signal is advanced or retarded until the receiver-generated replica signal correlates with the received one. Traditionally, this process is performed by code and carrier tracking loops that determine an error signal, which is a measure of the range and range rate difference between the generated and received signals. That difference between the received and replica signal is an error signal that is processed by a transfer function for generating input values communicated to a numerically controlled oscillator to advance or retard the generated replica signal. When the replica signal correlates with the received one, the tracking loop is said to be in lock and the feedback error signal is near zero. In this condition, the state of the code and carrier generation process can be sampled to obtain a measure of the pseudorange and pseudorange rate. The pseudorange is the geometric range between the transmit antenna and receive antenna plus a bias due to the user clock error. The pseudorange rate is approximated by the amount of range change for a predetermined amount of time plus a bias due to the drift of the user's oscillator frequency.

The pseudorange measurements are derived from an instantaneous sampling of the state of the code generator at a desired measurement epoch time. The pseudorange rate measurement is obtained by strobing the carrier loop twice over a small period of time and is a measure of a discrete change in pseudorange over a discrete period of time, determined from the carrier phase change. In the limit as the time interval goes to zero, the ratio of the delta pseudorange divided by delta time approaches the instantaneous time rate of change of the pseudorange, which rate of change is the pseudorange rate.

The tracking loops that track the incoming satellite received signal must adjust the phase and the frequency of the generated replica signal for many changing variables, such as user and satellite relative motion and user clock drifts. These tracking loops are traditionally called the code loop and the carrier loop, because the code loop tracks the phase of the pseudorandom noise (PRN) code and the carrier loop tracks the signal carrier frequency and the carrier phase. Although a phase-locked loop is the most common way to track a carrier signal, the GPS signals have a fifty hertz navigation data message superimposed on the code generation process, which can potentially change the phase of the signal by 180o every twenty milliseconds. To avoid a loss of lock when this occurs, a Costas tracking loop is used in place of the conventional phase lock loop. This allows the carrier to be tracked across 50 Hz data bit changes with no loss of lock. Frequency lock loops are also used for the carrier tracking and sometimes are used in combination with phase lock loops to improve robustness.

The design of tracking loop transfer functions is compromised to meet two conflicting requirements. On one hand, it is desired to have a low bandwidth of the tracking loop to filter out as much noise as possible. On the other hand, if the tracking loop is too sluggish because of a low operating bandwidth, the tracking loop cannot track the dynamics of the relative motion often caused by vehicular acceleration. Inertial aiding applies to the use of data from an IMU to assist the tracking loops or the extrapolation of the user's position and velocity. When inertial aiding is used in the context of tracking loops, the relative motion between the satellite's antenna and the user's antenna can be predicted to a certain accuracy based on the IMU measurements and the position and velocity of a satellite evaluated from the ephemeris data. A reduction of the bandwidth of the tracking loop is possible with inertial aiding because the loop need only track the errors in the aiding information as opposed to the absolute motion. A narrower bandwidth has the advantage of filtering out more noise from the loop during tracking.

GPS sets with IMU aiding, including those with communication receivers and navigation processors, must use a large enough tracking loop bandwidth to accommodate the dynamics of the relative vehicular motion and tolerate the associated reduced noise filtering of the tracking loop. The IMU aided GPS sets are able to use narrower bandwidth tracking loops with more noise filtering. The IMU aided GPS sets use known user's relative motion through measurements from the IMU and the satellite position and velocity data evaluated from the ephemerides to compute the line-of-sight rate between the user's antenna and the GPS satellite for providing rate data to aid the tracking loop. This allows the tracking loop gains to be reduced to a lower bandwidth so that the tracking loop only tracks the errors relative to the nominal motion provided by the IMU, user clock and ephemeris information. When a tracking loop operation is aided by IMU measurement, the tracking loop is said to be tightly coupled with the IMU.

Even with IMU tight coupling, and with the lower tracking loop bandwidth, the tracking loop must maintain lock on the signal by driving the internally generated replica signal to correlate with the received satellite signal. In a tightly coupled tracking loop, the aiding IMU information is used as reference motion, but the tracking loops must still use code and carrier phase error signals in a feedback loop to drive the internally generated replica signal to match the incoming satellite received signal. If the tracking loop fails to drive the error signal to zero, the amount of error that remains uncorrected is a measurement error that is fed into the navigation-processing algorithm as an unmodeled pseudorange and pseudorange rate measurement error. This time-correlated unmodeled pseudorange and pseudorange rate measurement error limits the allowable update rate of the navigation Kalman filter, because the assumption made in the Kalman filter processing is that the measurement errors are uncorrelated in time. This update rate limitation has traditionally limited the allowable processing rate of GPS measurements from an aided tracking loop to about one hertz. Although tracking loops use all of the data over the one-second interval to maintain lock, only the recent data prior to the measurement time is actually used to generate the pseudorange and pseudorange rate measurements. Most of the available inphase (I) and quadrature (Q) correlation output measurement data over the one-second interval is essentially used to keep the tracking loop in lock, but all of this I and Q information is not necessarily used to improve the pseudorange and pseudorange rate measurement accuracy due to the fading memory of the tracking loop having a lower but limited bandwidth.

If the tracking loop error builds beyond a certain threshold value, the loop is deemed to be out of lock and pseudorange and pseudorange rate measurements are not made until the loop reacquires lock. This out of lock condition is due to the nonlinearity of the correlation process and the use of linear loop designs that are only valid for small error conditions. If the loop loses lock, the received signal must then be reacquired. The reacquisition search process requires higher received signal strength than the tracking process, so when there is a marginal signal-to-noise situation for tracking, the loop may never reacquire lock.

A GPS receiver has multiple channels, one for each satellite tracked. Each GPS channel has a respective code tracking loop and carrier tracking loop that operates independently of each other. Hence, one tracking loop may lose lock due to a low signal-to-noise ratio even though other GPS channels are being normally tracked. The information from the other good channels is not used in the inoperative channel that may be out of lock due to a marginal signal to noise ratio that is insufficient to maintain lock.

The traditional tracking loop approach determines the code phase measurement independently of the carrier phase measurement and determines the pseudorange and pseudorange rate measurements independently on each of the two L1 and L2 GPS frequencies. Each of these four measurements is independently computed. Yet these measurements are not independent because these measurements are received by only one antenna. These measurements have not been processed dependently to provide enhanced measurement accuracy and robustness that can more readily overcome interference when used collectively.

Advanced tracking loop designs have been proposed to alleviate some of the loss of lock and reacquisition problems by tightly coupling IMU data with the carrier and code tracking loops. Prior tightly coupled systems are limited by the use of Costas carrier loops for determining twenty-millisecond bit boundary data without required a priori knowledge of the data bits. Conventional tracking loops require this data bit boundary knowledge in real time to support the correlation process. Some systems have been proposed for operating a Kalman filter at a much higher rate so that the Kalman filter is considered a part of the tracking loops. These approaches suffer from the requirement for huge processor throughput because the Kalman filter, that may have twenty or more state variables, must operate at several tens of Hertz.

With unlimited integration Kalman filter processor throughput, the integration Kalman filter could be operated at extremely high rates with no loss of optimality due to time correlated tracking loop errors. This high rate operation is similar to what has been called a vector delay lock loop. A vector delay lock loop is a method to track all satellites in view simultaneously with one common algorithm. The vector delay lock loop broadens the normal aided and unaided tracking loop design approach to both code and carrier tracking on all in-view satellites. The entire algorithm must run at very high processing rates because there is no provision for federated processing.

Unfortunately, current processor throughput cannot support Kalman filter rates of several tens of Hertz with the large state vectors required for GPS inertial navigation. Large Kalman filters may be decomposed into one or more federated Kalman filters within a Kalman filter processing architecture. For example, a large Kalman filter can be decomposed into two partitions including a large integration Kalman filter and a high-rate optimal prefilter that are more compatible with modern processing speed requirements. The fundamental principle is to decompose the complete formulation into suitable partitions such that the important bandwidths and models are appropriate for each partition. In IMU aided GPS sets designed to date, large integration Kalman filters have not been decomposed into suitable partitions to allow optimal processing of the raw GPS samples with the IMU samples.

In traditional tracking loops, there is the possibility that the errors in the loops are time correlated because there is a delay in the loops as the loops drive the error signal to zero. Depending on the order of the tracking loop, there may actually be a steady state tracking error when the order of the dynamic motion exceeds the order of the tracking loop. This is commonly called the dynamic stress error. Even with inertial aiding to the tracking loop, the tracking error can be time correlated because of time-correlated errors in the aiding data. This possibility has limited tracking performance because the tracking loop measurement errors can manifest themselves as errors in the state vector after processing, which in turn can affect future aiding data and possibly cause the IMU navigation and GPS tracking system to generate a wrong but consistent navigation solution. With normal tracking loops, the GPS measurements used by the Kalman filter are deliberately spaced out in time to avoid the unwanted temporal correlations of the tracking loops.

In conventional tracking loops, the measurement noise variance used by the Kalman filter is usually estimated from the tracking state and the carrier-to-noise ratio. There is no guarantee that these values are consistent with the actually realized measurement errors. Hence, a large integration Kalman filter may process measurements with an erroneous uncertainty variance of the measurement noise. In conventional tracking loops, the measurement of pseudorange acceleration is not considered because there is no apparent way to obtain a low-noise estimate of the pseudorange acceleration from the tracking loops. Conventional tracking loops do not have an ability to determine the pseudorange acceleration. The use of a pseudorange acceleration measurement has many potential benefits in the observability of user clock and IMU error instability. With a pseudorange acceleration measurement, there is a more direct measurement of higher order errors with increased observability. Normally, these errors are observed through dynamic coupling into pseudorange and pseudorange rate measurements. Hence, without the pseudorange acceleration measurements, the observability of clock and IMU instabilities is limited. This limitation can be reduced using highly accurate user clocks and inertial measuring units.

In traditional receivers, the integrate-and-dump process is limited to twenty-milliseconds due to the potential change of a data bit in the navigation message. A technique called data stripping is used to integrate for longer periods of time by using a priori knowledge of the data bit values. A large percentage of the future data bit values is predictable once it is collected, especially with prior knowledge of the data to be uploaded to the satellites. Although data stripping has been demonstrated to work, the results have been somewhat disappointing relative to predicted improvements and the logistics of determining the future navigation data message is cumbersome. These and other disadvantages are solved or reduced using the present invention.

SUMMARY OF THE INVENTION

An object of the invention is to provide a tracking method of received Global Positioning System (GPS) signals using a correlation process that is driven by the best estimate of the navigation state vector based on inertial measurement unit samples from an inertial navigation system (INS) and GPS ephemeris data from a GPS satellite to generate replica signals for correlation with the received signals for determining pseudorange and pseudorange rate residual errors that in turn are used to update the navigation state vector for the next major cycle that generates the replica signal for the next major cycle.

Yet another object of the invention is to provide a tracking method of received GPS signals using a correlation process that is driven by the best estimate of the navigation state vector based on inertial measurement unit samples and GPS ephemeris data to generate replica signals for correlation with the received signals for determining pseudorange and pseudorange rate residual errors that in turn are used to update the navigation state vector for the next major cycle that generates the replica signal for the next major cycle using a federation of Kalman filters, with a first residual Kalman prefilter sampling the correlator output signals and providing pseudorange and pseudorange rate error data to a second integration Kalman filter receiving pseudorange and pseudorange rate error data for computing navigation errors for updating the navigation solution for modifying the replica signals to reduce the errors in the navigation state vector and in the future replica signal for the next major cycle.

The ultratight method is a coupled GPS and INS processing method that drives signal generators for each satellite channel using information from the current best estimate of the navigation state vector and satellite position and velocity predicted from the satellite ephemerides. The best estimate of the navigation state vector is based on the previous major cycle of an integration Kalman filter, usually operating at one Hertz, and the IMU samples since a previous major cycle update. The navigation state vector contains best estimates of user position, velocity, attitude, receiver clock errors as well as calibration coefficients for the IMU. In the ultra-tight method, the quadrature I and Q samples from a correlator are sent to a Kalman prefilter that processes the samples at a high rate for generating residual errors sent to a lower rate integration Kalman filter. This federation of Kalman filters partitions processor throughput and provides more realistic modeling for estimating the error state vector based on the dual frequency code and carrier I and Q sampling. The ultratight method enables batch processing of the raw I and Q GPS samples in the Kalman prefilter to enable sophisticated algorithms to be used to for data bit estimation and multipath detection and mitigation, because prefilters relax the real time requirements of the integration Kalman filter.

The ultratight coupling method uses federated Kalman filtering as an equivalent operation in place of a single high-speed Kalman filter used as an element in a closed-loop GPS and IMU mechanization. The method decomposes a large optimal high-speed Kalman filter into one or more residual Kalman prefilters and at least one large integration Kalman filter that synergistically function together as part of a closed loop that accomplishes the same functionality as the large optimal Kalman filter. Using this method, the integration Kalman filter that integrates the GPS measurements with the IMU measurements can operate at modest rates, typically around one hertz, over the major cycle. The residual Kalman prefilter samples correlator output signals at fifty hertz over the major cycle time to provide error estimate data for the integration filter at one hertz from the accumulated samples over the major cycle period. The limiting factor that determines how fast or slow the integration Kalman filter can operate is now based primarily on the stability of the error sources in the user's crystal oscillator clock and the inertial measurement unit (IMU). IMU measurements, time propagation using the user's oscillator and satellite ephemerides, all of which are not vulnerable to jamming, are used to drive the correlation process for replica signal generation, providing high jamming tolerance. Integrated code and carrier measurements are processed for multiple frequencies, including the global positioning system (GPS) L1 and L2 carrier frequencies. Accurate measurement variance determinations by the Kalman prefilter are based on actual measurement residuals from the correlator outputs, namely inphase (I) and quadrature (Q) samples of the received signal from the GPS satellites in view. Rapid convergence of the integration Kalman is now possible due to the availability of pseudorange acceleration measurements. Ionospheric propagation delays in the form of total electron content (TEC) are properly modeled in the navigation prefilter solution, which increases the accuracy of the navigation solution.

The high rate I and Q samples are used to generate low rate pseudorange and TEC residuals in a Kalman prefilter. The Kalman prefilter uses all measurement I and Q samples from all in-view GPS satellites between integration Kalman filter epochs to compress that sampled information into summary measurement residuals that are provided to the large integration Kalman filter during each major cycle. Because the compression process does not rely upon conventional tracking loops that would otherwise incur time correlation errors, all the sampled data can be compressed without incurring temporal unmodeled correlation errors, and all I and Q sampled data is used by the Kalman prefilter during the major cycle to provide accurate low-rate residuals at the end of the major cycle. The Kalman prefilter functions synergistically with the correlation process. The output of the Kalman prefilter is actually a measurement residual error vector needed by the integration filter based on the errors in the code and carrier replica signals fed to correlators, rather than an absolute measurement of pseudorange or pseudorange rate. Hence, the Kalman prefilter formulation is based on the temporal buildup of GPS observation errors that result from the integration of the accelerometers and gyros, using the best estimate of the navigation state vector from the previous major cycle of the integration Kalman filter epoch, including the best estimate of the inertial instrument calibration errors. The integration Kalman filter uses this best estimate of predicted navigation state vector to generate high-rate samples of the predicted pseudorange and the pseudorange rate for the major cycle of the integration Kalman filter. This predicted pseudorange and pseudorange rate information, in conjunction with the satellite ephemerides and inertial measurement data, is used to generate and update the code and carrier replica signals used in the correlation process for improved tracking robustness and accuracy. This correlation process compares the incoming signal to the code and carrier replica signals and generates I and Q sampled outputs using an integrate-and-dump process in the correlator. The I and Q samples are measures of the errors between the correlated received and replica signals. All of the Is and Qs over the major cycle are used to estimate a vector of errors in pseudorange, pseudorange rate and pseudorange acceleration, which are evaluated at the end of the major cycle. The pseudorange, pseudorange rate and pseudorange acceleration errors are data elements of the measurement residual vector needed by the integration Kalman filter at the next measurement epoch. The residual Kalman prefilter essentially collapses m I and Q samples over the major cycle into a 3N measurement residual vector, where m is the number of integrate-and-dump intervals in a major cycle and N is the number of satellites in view. For each of the N satellites being tracked, there is an associated correlator, residual Kalman prefilter, code generator, code clock NCO, carrier NCO, pseudorange and rate calculator, satellite position velocity calculator, ephemeris demodulator, for respectively processing GPS sampled received signals. The three measurement residuals are generated for each satellite in view, namely pseudorange, pseudorange rate and pseudorange acceleration. In addition, the residual Kalman prefilter generates a measurement covariance matrix M for each satellite for use by the large integration Kalman filter. The covariance matrix is a 3×3 matrix and is computed from the a posteriori covariance matrix and adjusted to be consistent with the actual measurement innovations from the Kalman prefilter.

The primary advantage of the ultratight method is the inherent robustness in the presence of intentional jamming or unintentional interference. A second advantage is that method offers improved tracking and more accurate navigation solution computation. Whereas conventional tracking loops are subject to the loss of lock and operate independently from each other, the ultratight method directly computes the measurement residual for the integration Kalman filter based on all integrate-and-dump I and Q samples from the correlators for multiple respective satellites. Very accurate pseudorange and pseudorange rate predictions based on the best estimate of the navigation state vector are used to generate the replica signals. Consequently, the ultratight method does not easily lose lock on the satellite signals because the ultratight method continuously correlates received and replica signals over the entire integration Kalman cycle for all satellites in view. When one received signal from a satellite is corrupted by substantial interference, the other received signals continue to be correlated with their respective replica signals so that the correlation process and the navigation updating continues on all received signals without disruption. The prefilter processing continues to make optimal use of any available IMU data, GPS ephemeris data, and correlator measurements, independent of any loss of lock. When a given satellite's received signal is jammed for an entire major cycle, the resulting measurements will have a measurably large variance that can be deweighted by the integration Kalman filter through the associated prefilter measurement covariance matrix. The correlation process continues to operate on all satellite signals using the accurate respective replica signals generated by the best estimate of navigation state, which is in turn determined from all received signals from the other GPS satellites, from GPS ephemeris data for the other GPS satellites and from the integrated accelerometer and gyro IMU measurements.

The compressed measurement residual vector generated by the residual Kalman prefilter has a reduced measurement variance relative to each individual sample because the residual vector is prefiltered using all I and Q correlator output samples over the entire major cycle of the integration Kalman filter. The Kalman prefilter provides equal weight to all sampled I and Q data in the interval between Kalman cycles without the fading memory limitation upon the reduction of the measurement errors associated with conventional tracking loops. Because the I and Q sampled data between major cycles is essentially processed in a batch, the measurement variance sent to the integration filter can be empirically determined from the prefilter innovations relative to the best predicted estimate of the navigation solution, pseudorange and pseudorange rate data. The process model for the Kalman prefilter can be a quadratic function of time, because the Kalman prefilter is driven by the extrapolation of errors in the state vector that is a function of the IMU and user clock errors. Over a major cycle of the integration Kalman filter, the error buildup should not have a higher order behavior than a quadratic function of time, because the error buildup is the result of initial position and velocity estimate errors, IMU calibration errors and user clock errors, all of which are second order effects or lower.

Another advantage of the ultratight method is the relaxed requirement for real-time processing in the Kalman prefilter. Whereas traditional tracking loops require real time operation, which severely limits the processing possibilities, the Kalman prefilter can operate near real time. That is, the Kalman prefilter can collect all the I and Q sampled data for a major cycle and process this sample data during the next major cycle thereby enabling advanced signal processing algorithms to be employed. For example, the I and Q data can be sampled and processed after its collection to estimate the fifty-hertz GPS navigation message data bit values. Normally, without prior knowledge of the navigation message data that is modulated on the GPS signals, a receiver integrate-and-dump correlation process is limited to twenty-milliseconds because the polarity of the data bits is not known in advance in order to properly generate the replica signal. This twenty-milliseconds time limit also limits the ability of conventional tracking loops to maintain signal lock during interference and low signal-to-noise environments because the amount of coherent data to process is bounded. If coherent integration could be performed across the twenty-millisecond boundary, longer spans of data could be processed and higher jamming immunity could be attained. With near real time processing, the computation of the pseudorange and pseudorange rate errors can be deferred to subsequent time epochs such as a later fifty hertz epoch or even the next major cycle. Hence, at a data bit boundary, the integrate-and-dump correlation process can temporarily continue using both possible data bit polarities for the replica signal generation while the GPS data bit polarities are determined at a later time. Once the data bits are determined, the accumulated correlator output data for the correct data bit choice can be coherently concatenated with the previous data bit period as if it were known at its time of validity. The data from the incorrect choice is discarded. The net result of the accumulated sum from the total integrate-and-dump process is a coherent integration across a twenty-millisecond data bit boundary, which will also yield higher anti-jam and interference suppression. These and other advantages will become more apparent from the following detailed description of the preferred embodiment.

DETAILED DESCRIPTION OF THE PREFERRED EMBODIMENT

Figure 1:
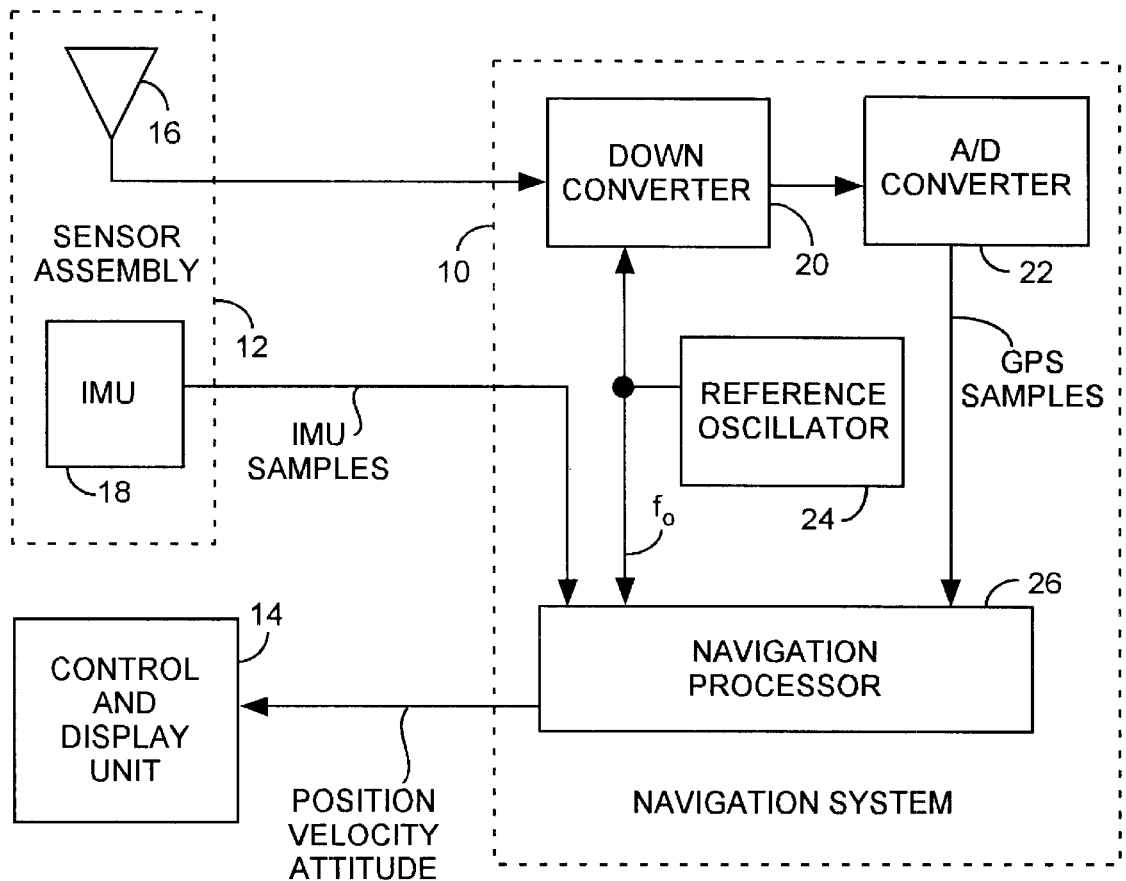
FIG. 1 is a block diagram of a Global Positioning System (GPS) inertial navigation system.

An embodiment of the invention is described with reference to the figures using reference designations as shown in the figures. Referring to FIG. 1, a global positioning system (GPS) inertial navigation system includes a navigation system 10 receiving GPS signals and inertial measurement unit samples from a sensor assembly 12 and provides position and velocity data to a control and display unit 14. The navigation system 10 functions as a GPS inertial navigation system tracking GPS signals from a plurality of in-view satellites, not shown. The sensor assembly 12 includes an antenna 16 for receiving and providing received GPS signals and includes an inertial measurement unit (IMU) 18 providing the IMU sample signals, both of which are communicated to the navigation system 10. In the preferred form, the IMU 18 may be a microelectromechanical system (MEMS) IMU embedded in the antenna 16. The navigation system 10 includes a downconverter 20 for frequency downconversion of the received GPS signals using a user's reference oscillator 24 providing an fo internal frequency reference, and includes an analog-to-digital (A/D) converter 22 communicating digitized GPS samples to a navigation processor 26. The navigation processor 26 also receives the IMU samples and provides the position and velocity data to the control and display units 14.

Figure 2:
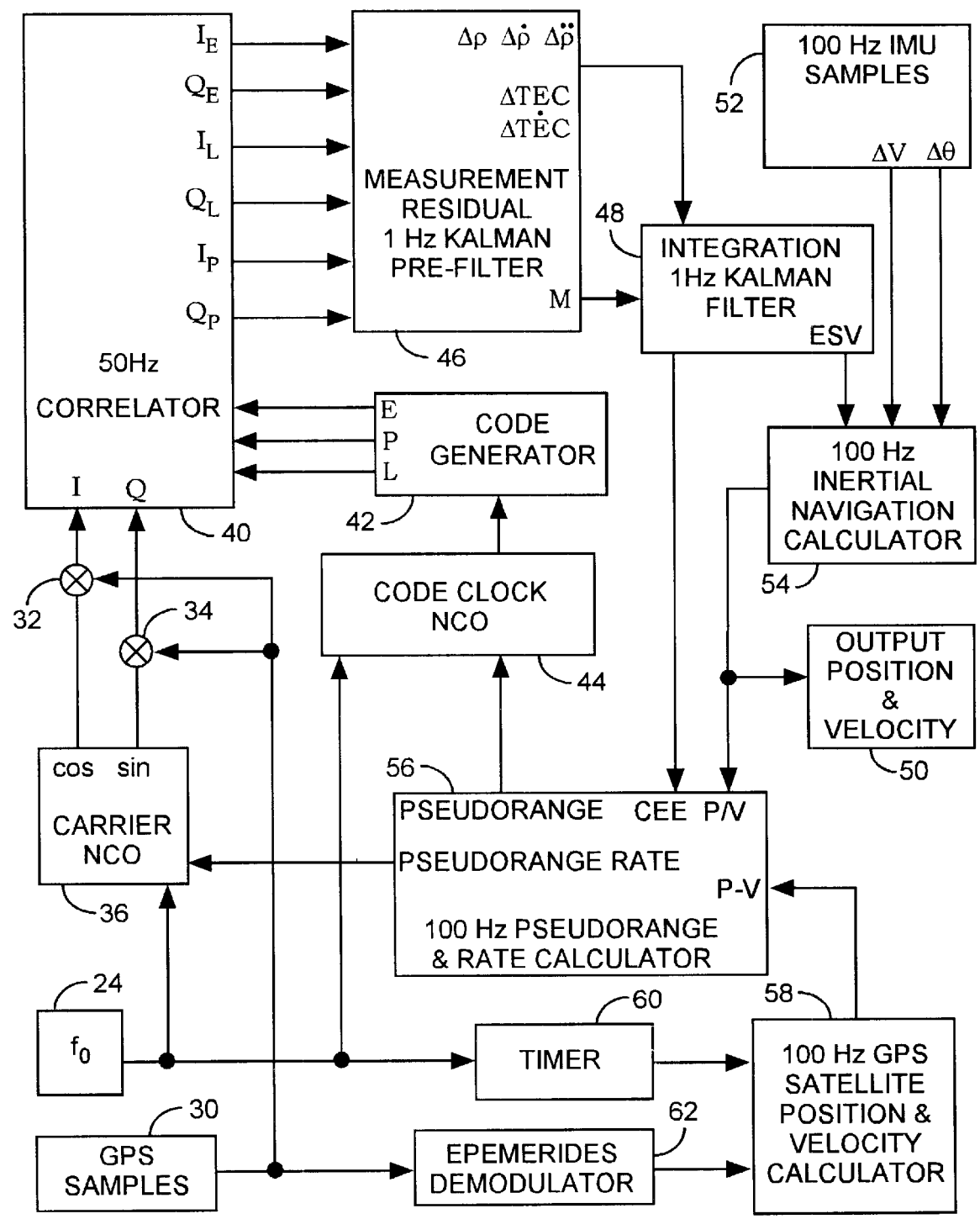
FIG. 2 is a block diagram of a navigation processor.

Referring to FIGS. 1 and 2, and more particularly to FIG. 2, the navigation system 10 includes a navigation processor 26 receiving the digitized GPS samples 30 that are communicated to mixers 32 and 34 for providing inphase (I) and quadrature (Q) signals respectively using cos and sin demodulation signals from a carrier numerically controlled oscillator (NCO) 26 using a reference oscillator fo 24. The cos and sin demodulation signal are replica carrier signals for carrier demodulating the received GPS samples 30. The I and Q sample signals are received by a 50.0 Hz correlator 40 receiving early (E), prompt (P) and late (L) code replica signals from a chipping code generator 42 receiving a chipping code clocking signal from a code clock NCO 44. The correlator 40 provides inphase and quadrature, early, prompt, and late, GPS correlated sample signals IE, QE, IL, QL, IP, QP, communicated at fifty Hertz into a measurement residual Kalman prefilter 46 having a 1 Hertz output. The prefilter 46 can receive I and Q sampled outputs from two correlators 40 to accommodate dual f1 and f2 frequency integration using two respective NCOs 36 and 44 and two respective code generators 42 for providing an integrated error vector to the single integration filter 48. The Kalman prefilter 46 computes the errors in the pseudorange $\rho$ and pseudorange rate $\dot{\rho}$ and pseudorange acceleration $\ddot{\rho}$. The pseudorange rate $\dot{\rho}$ is the first derivative time rate of the change of the pseudorange rate $\rho$. The pseudorange acceleration $\ddot{\rho}$ is the second derivative time rate of change of the pseudorange $\rho$. The Kalman prefilter 46 also computes the errors in the total electron content (TEC) data as part of a measurement vector of errors. The Kalman prefilter 46 computes a measurement covariance matrix M indicating the uncertainties in the measurement vector of errors for a number of samples m over a major cycle epoch time. The Kalman prefilter measurement vector of errors and the covariance matrix are communicated to a large integration one hertz Kalman filter 48 having a one-second major cycle time period between Kalman filter epochs. The integration Kalman filter 48 in turn repetitively provides estimates of position and velocity errors in an error state vector (ESV) that are used to compute the output position and velocity data 50 communicated to the control unit 14. The IMU samples 52 are communicated to a 100 Hz inertial navigation calculator 54 that computes the best estimate of the navigation state vector solution defined by position and velocity data P/V. The term P/V indicates the calculated position and velocity data. The position and velocity data P/V is calculated from the IMU samples 52 and the error state vector ESV. At the end of each of the one-second major cycles, the Kalman filter updates the ESV and then communicates the ESV to the navigation calculator 54. The IMU samples 52 are repetitively generated, for example, one hundred times a second, and include differential velocity samples ΔV and differential attitude samples Δθ that are communicated to the 100 Hz inertial navigation calculator 54 also receiving the error state vector every second from the integration Kalman filter 48. The inertial navigation calculator 54 provides the best estimate of the navigation state vector solution indicated by the position and velocity data (P/V) communicated to a 100 Hz pseudorange and pseudorange rate calculator 56 that in turn provides pseudorange rate data to the carrier code NCO 36 and provides pseudorange data to the code NCO 44. The pseudorange and pseudorange rate calculator 56 also receives calculated GPS satellite position and velocity (P-V) data from a 100 Hz GPS satellite position and velocity calculator 58, and receives user clock error estimates (CEE) from the integration Kalman filter 48. The term P-V references the GPS satellite calculated position and velocity data. The clock error estimates CEE include a clock phase error and clock frequency error that is the time derivative of the clock phase error. The calculated pseudorange is equal to the geometric line of sight range to a satellite adjusted by the clock phase error estimates CEE and certain signal propagation compensation terms, such as the nominal ionosphere and troposphere delays that are not shown because their presence is not germane to this invention. The geometric range is computed from the GPS calculated position and velocity data P-V, and from the IMU calculated position and velocity data P/V. The pseudorange rate is equal to the relative geometric velocity to the satellite from the user antenna 16 plus the clock frequency error estimate. The GPS satellite position and velocity calculator 58 receives timing signals from a timer 60 using the reference fo 24 and receives demodulated ephemeris data from an ephemeris demodulator 62 using the GPS samples 30 to compute the GPS position and velocity data P-V.

The ultratight method uses conventional GPS pseudorange computation tightly coupled with the correlation process to improve the ability to maintain tracking lock upon the received GPS signals. The 100 Hz inertial navigation calculator 54 is used for strapdown inertial navigation processing. The GPS satellite position and velocity calculator 58 is used for satellite GPS position and velocity calculation. The pseudorange and pseudorange rate calculator 56 is used for line-of-sight pseudorange and pseudorange rate predictions. The carrier NCO 36 is used for generating carrier replica signals for quadrature demodulation of the received GPS samples. The code generator 42 is used for early, prompt and late replica signal generation. The correlator 40 is used for integrate-and-dump correlation of the I and Q carrier demodulated signals with the early, prompt and late code replica signals.

The correlation process is based upon the early, prompt, and late replica code signal generation by the code generator 42, and upon the replica carrier generation by the carrier NCO 36. As the pseudorange and pseudorange rate data from the calculator 56 are refreshed during each one hundred hertz cycle, the replica carrier cos and sin signals from the NCO 36 and the replica early prompt and late replica codes signals are adjusted. The correlator 40 operates at 50.0 Hz enabling conventional early, prompt, and late correlation by providing the early, prompt, and late I and Q samples to the Kalman prefilter 46. The Q and I samples contain amplitudinal informational that can be used with signal correlation functions to estimate the code and carrier errors. The carrier and code phase offsets of the replica signals as compared to the received GPS sample signal can be determined as offsets knowledge of the signal correlation function. The carrier and code phase offsets are used to estimate pseudorange, pseudorange rate, and TEC errors by the Kalman prefilter 46.

Figure 3:
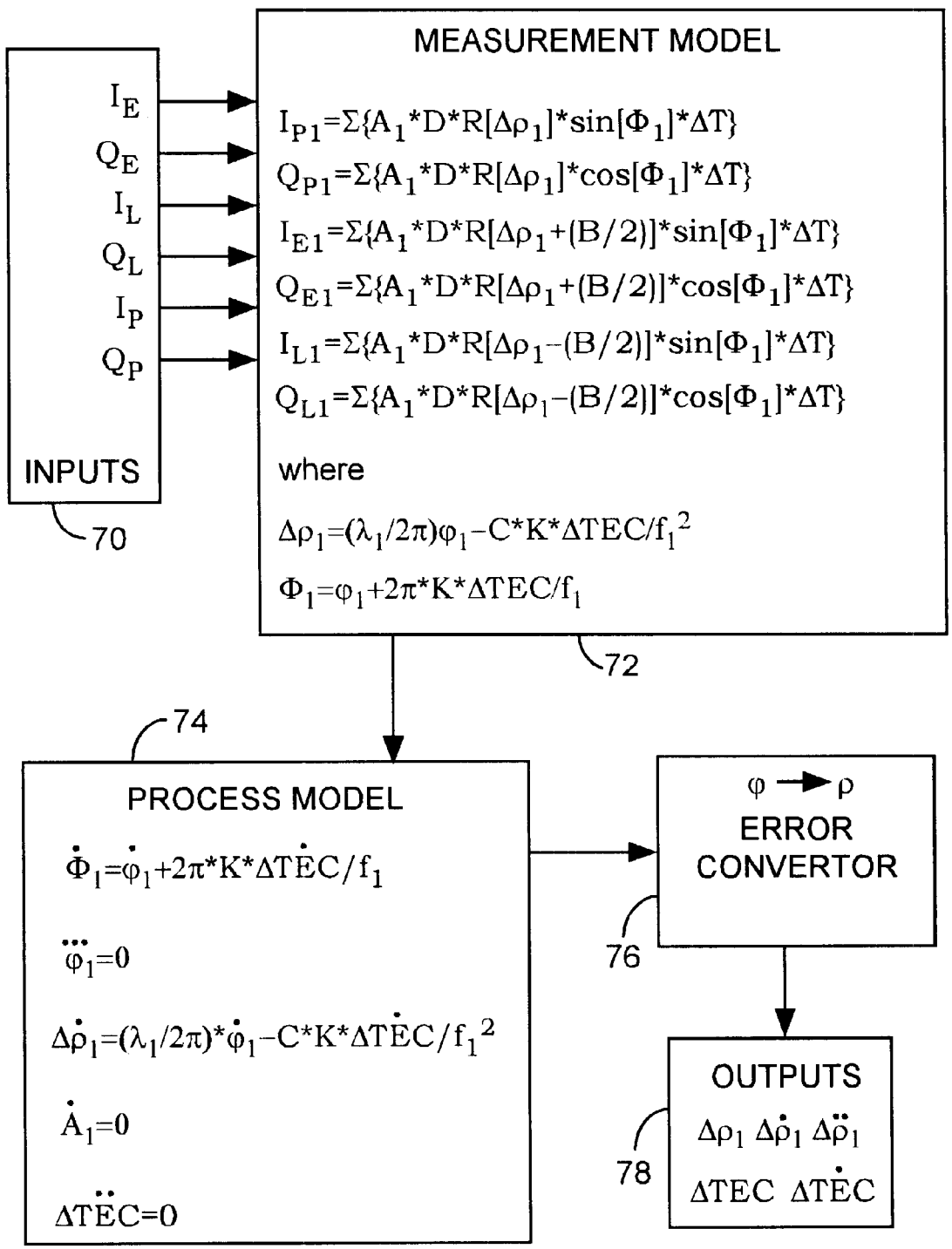
FIG. 3 is a block diagram of a single frequency Kalman pre-filer.
Figure 4:
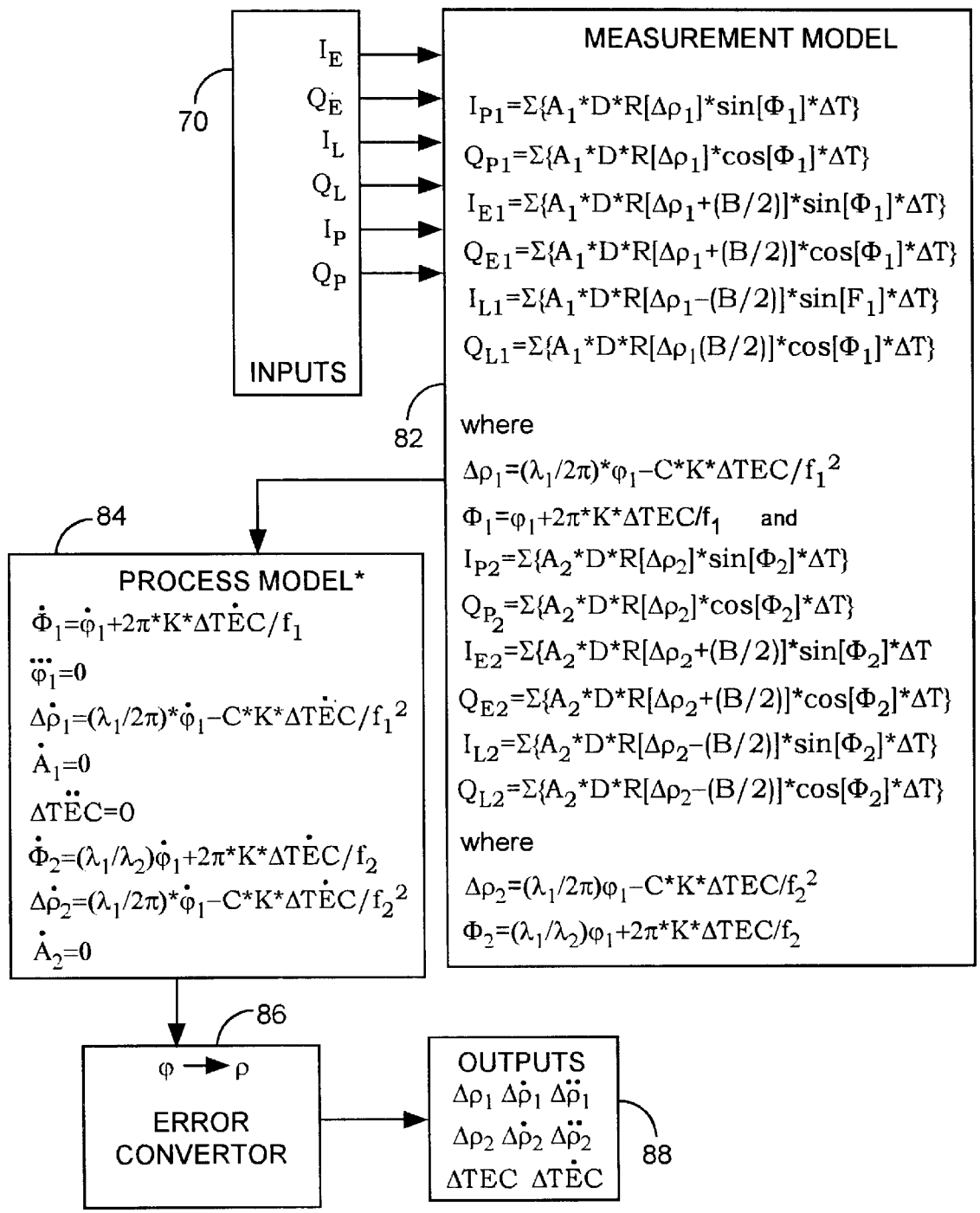
FIG. 4 is a block diagram of a dual frequency Kalman pre-filter.

Referring to all of the Figures, and more particularly to FIGS. 3 and 4, the Kalman prefilter 46 and the integration Kalman filter 48 are conventional Kalman filters. Both of the Kalman filters 46 and 48 receive input measurements. Each of the filters comprise a measurement model that relates the input measurements to state variables. Both filters comprise a dynamic process model that relates state variables to output data. Both Kalman filters 46 and 48 function to provide the best estimate of respective output data as related by the state variable and dynamic process model to the input sampled measurements. The signal frequency residual Kalman prefilter 46 of FIG. 3 receives I and Q inputs 70, comprises a single frequency measurement model 72, comprises a single frequency process model 74, comprises a single frequency error converter 76, and provides single frequency pseudorange, pseudorange rate, pseudorange acceleration, TEC, and TEC rate error data. An L1 and L2 dual frequency residual Kalman prefilter 46 of FIG. 4 receives I and Q inputs 70, comprises a dual frequency measurement model 82, comprises a single frequency process model 84, comprises a dual frequency error converter 86, and provides dual frequency pseudorange, pseudorange rate, pseudorange acceleration, TEC, and TEC rate error data 88. In the preferred form, a dual frequency Kalman prefilter operates on dual frequencies, but any number of GPS frequencies can be used with appropriate updates in the measurement model 82 and process model 84.

Regardless of the number of GPS frequencies available, the Kalman prefilter 46 receives the I and Q samples 70 and as input measurements and provides outputs 78 or 88 as the best estimate of the pseudorange, pseudorange rate, pseudorange acceleration, and TEC errors. The integration Kalman filter 48 receives the pseudorange, pseudorange rate, pseudorange acceleration, and TEC errors as input measurements and provides the best estimates of the clock errors CEE and the navigation errors in the form of the error state vector ESV.

The ultratight method relies upon calculated predicted pseudorange and pseudorange rate data generated from IMU samples and GPS ephemeris data to improve the correlation process by providing the calculated pseudorange rate data to the carrier NCO 36 and by providing pseudorange data to the code clock NCO 44 for respectively modifying replica sin and cos carrier signals and the early, prompt, and late replica signals, both of which modifications are based upon the best estimate of the navigation state vector solution indicated by the P/V and the CEE data, and current GPS ephemeris data. That is, the replica carrier and code signals are updated by calculated pseudorange and pseudorange rate data based upon best estimate of the navigation state vector solution and current ephemeris data so that the correlator 40 provides I and Q samples for determining errors in the replica signals relative to the GPS received samples 30, so that, the prefilter 46 can update current pseudorange, pseudorange range, pseudorange acceleration, and TEC error data that is then used to modify the navigation state vector solution in a closed loop manner, so that, the subsequent updated replica signals approach a true perfect replica of the received signal in time, as the navigation state vector solution converges during continued updates when reducing the navigation error data, so that, the best estimate of the navigation state vector solution is continually, accurately updated, while the tracking is based upon the replica signals continuously adjusted based upon the current best estimate of the navigation state vector solution for improved continuous coupled closed loop tracking of the received signals.

The ultratight method may be used in combination with conventional signal acquisition, bit synchronization, frame synchronization, and data demodulation method, all not shown. The ultratight method is preferably applied after a first fix has been attained after acquisition and the GPS and inertial navigation state vector solution is in steady state condition with conventional code and carrier tracking in lock, commonly referred to as state five tracking. After the steady state solution is obtained, the ultratight method offers superior code and carrier tracking with improved immunity to interference and/or degradation in signal-to-noise ratio of the received signals.

Figure 5:
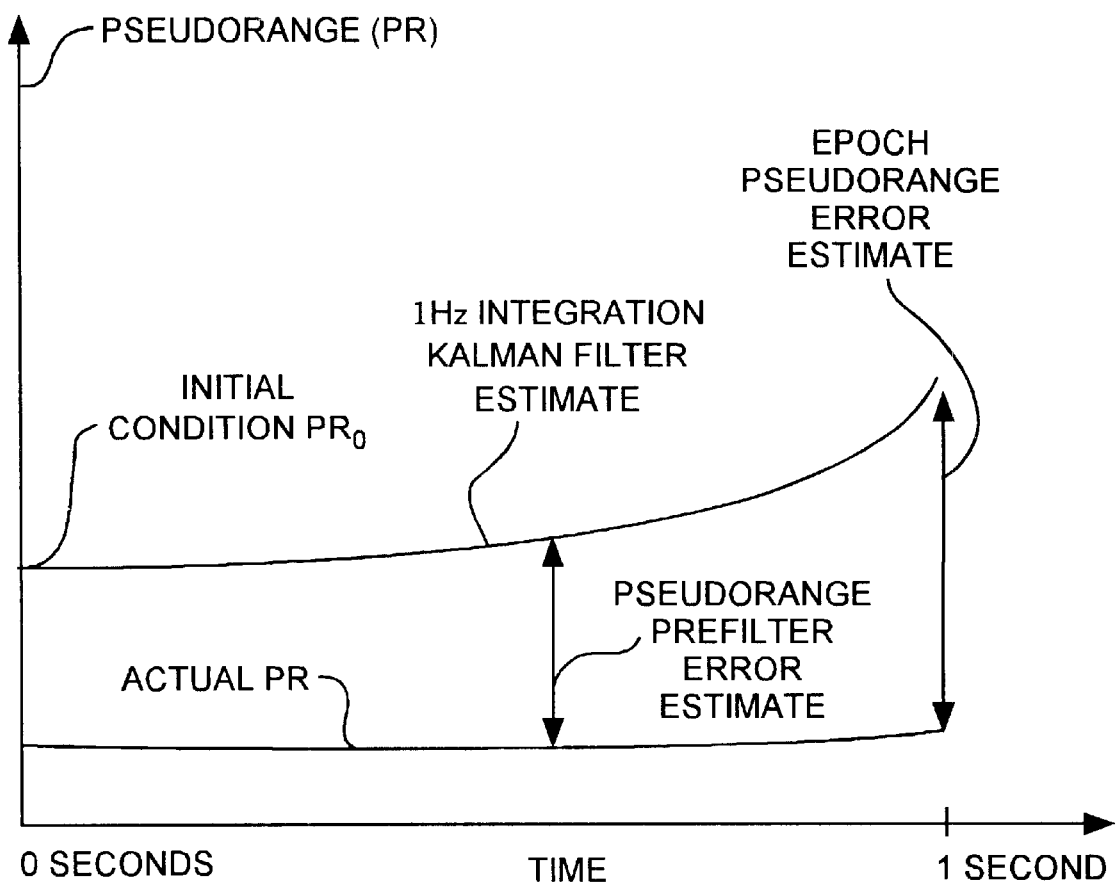
FIG. 5 is a graph depicting pre-filter pseudorange error estimates.

The ultratight method relies upon the Kalman prefilter 46 operating in a single or multiple frequency mode to obtain a prefilter pseudorange error estimation as depicted in FIG. 5. The integration Kalman filter 48 provides error estimates in an error state vector ESV form subdivided into a number of component error state vectors each having a predetermined number of state variables. The component error state vectors include a position error vector, a velocity error vector, a user clock error vector, an attitude error vector, an accelerometer null bias error vector, and a gyro drift error vector, each being a three dimensional error state vector. Those skilled in the art of Kalman filter design can readily formulate the error estimate vector representation in the integration Kalman filter.

The steady-state navigation state vector solution is indicated by the P/V and CEE data and is used by the pseudorange and pseudorange rate calculator 56 for calculating the predicted pseudorange and pseudorange rate based on position, velocity and clock state variables from the previous one-second epoch time period. The IMU inertial navigation calculator 54 is used to predict the best estimate of the user's navigation state vector solution over m samples in real time over the one-second epoch interval from the last one-second major cycle interval, by integrating the gyro and accelerometer outputs $\Delta V$ and $\Delta \theta$. The estimated navigation state vector solution prediction P/V is performed using conventional strapdown navigation equations. The high-sample-rate GPS satellite position and velocity calculator 58 provides calculated GPS position and velocity data P-V using the conventional GPS satellite computation equations by using ephemeris data collected from the GPS samples 30 from each GPS satellite in view. The pseudorange and pseudorange rate calculator 56 uses conventional range and range rate equations for generating the calculated predicted pseudorange and pseudorange rate data. The predicted pseudorange and pseudorange rate data from the calculator 56 are commands to the carrier NCO 36 and code clock NCO 44 used to generate replica E, P and L code signals and cos and sin replica carrier signals that reflect the best estimate of the GPS received sample signals 30 for all visible satellites. The incoming satellite GPS sample signals 30 are mixed with the replica cos and sin carrier signals and correlated through the integrate-and-dump correlator process in the correlator 40 to correlate the E, P and L replica code signals with the received GPS samples 30. This correlation process is performed for each satellite in view for the early, prompt, and late version of the replica code signal. The resulting output from the correlation process is the six-dimensional I and Q vector of inphase and quadrature sample measurements of the early, prompt, and late correlation for each satellite. There are N Kalman prefilters 46 for a respective N number of tracked satellites in view. The N Kalman prefilters are preferably connected to only one integration Kalman filter 48 for receiving the error data and a covariance matrix M from each Kalman prefilter 46 and for providing only one navigation error state vector ESV. The GPS correlated samples Is and Qs for each satellite are used as measurements in the Kalman prefilter 46 that has state variables for each satellite. These I and Q sample measurements are coherently integrated in each of the N Kalman prefilters 46 for periods up to, for example, twenty-milliseconds without direct knowledge of the IMU navigation state vector solution nor the GPS ephemeris navigation message data bits.

The Kalman filters 46 and 48 contain measurement and process models defining mathematical relationship between input measurements, output data and state variables. As used therein, in the preferred form, subscripts 1 and 2 designate the dual L1 and L2 GPS carrier frequencies arbitrarily referenced respectively as f1 and f2. The local oscillator frequency is referenced as fo. The term $\lambda 1$ and $\lambda 2$ are the wavelengths of the corresponding carrier frequency signals f1 and f2. The subscripts E, P and L respectively indicate early, prompt, and late code replica signals. The terms I and Q respectively indicate inphase and quadrature component signals. The one, two, or three overstrike dots respectively indicate the first, second and third time derivatives. The term $\rho$ is the pseudorange in meters. The term $\dot{\rho}$ is the pseudorange rate, that is the first time derivative of the pseudorange, in meters per second. The term $\ddot{\rho}$ is the pseudorange acceleration. The term $\Delta \rho$ is the pseudorange error in meters. The term $\Delta \dot{\rho}$ is the pseudorange rate error in meters per second. The term $\Delta \ddot{\rho}$ is the pseudorange acceleration in meters per second2. The term $\Phi$ is the total phase error due to the sum of navigation errors and total electron content (TEC) temporal variations in radians. The term $\phi$ is the phase error due to navigation errors in radians. The term $\dot{\phi}$ is the phase rate error due to navigation errors in radian per second. The term $\ddot{\phi}$ is the phase acceleration error due to navigation errors in radians per second2. The term $\dddot{\phi}$ is the phase acceleration rate error due to navigation error in radians per second3, which is set to zero indicating the phase acceleration error $\ddot{\phi}$ is a linear function of time. The term $\Delta TEC$ is the error in the TEC of the ionosphere in electrons per meter2. The term A is the signal amplitude error in volts. The term $\dot{A}$ is time rate of change of the signal amplitude error A that is set to zero. The term R is the code correlation function of the correlator 40. The term D is the value of the data bit (+/−1) and the term B is the chip duration in seconds. The term $\Delta T$ is the sample rate of the correlator 40. The term $\Sigma$ is the sum over the integrate-and-dump intervals of the correlator 40 extended through each integration epoch interval. The term C is the speed of light. The value K relates the ionospheric propagation delay to the TEC and to the frequency f and is equal to 1.345×10-7cycles2-m2/second-electron. The term * is the multiplication operator. The defined measurement models 72 and 82 and dynamic process models 74 and 84 enable the implementation of the Kalman prefilters 46 by those skilled in the art.

Each Kalman prefilter 46 estimates pseudorange errors using state variables relative to the predicted replica signals for each satellite. Although the replica generation process must be performed in real time, the prefilter can operate in near real time, because the pseudorange, pseudorange rate, pseudorange acceleration and TEC error outputs are not needed until the next integration Kalman filter epoch. This near real time Kalman prefilter operation enables the processing of the Is and Qs samples in a near optimal and robust manner. The Kalman prefilter 46 can batch process all the I and Q samples over the one-second epoch interval for robust processing. The code and carrier error are estimated in the measurement models 72 and 82 of the Kalman prefilter 46 to provide the pseudorange, pseudorange rate, pseudorange acceleration, and TEC error estimates. The coupling between code and carrier signals are explicitly modeled in the dynamic process models 74 and 84 of the Kalman prefilter 46. That is, the code and carrier estimates from the Kalman prefilter 46 are coupled within the process models 74 and 84 to aid the estimation of both. The higher derivatives of the phase are also estimated, as well. For example, the third derivative of these carrier and code coupled estimations and higher order derivative estimations provide a measure of the pseudorange acceleration over the one-second integration of the I and Q samples.

The residual Kalman prefilter formulation preferably includes a model for the ionospheric effects on the carrier and code signals to distinguish between changes in the measurements that are due to navigation errors against those that are due to TEC errors. Accurate estimation of the ionospheric errors is provided by modeling the effect of TEC on both the code and carrier received signals. The output of the Kalman prefilter 46 is then the best estimate of the residual pseudorange, pseudorange rate, and pseudorange acceleration at the end of the one-second interval relative to the navigation state vector solution that was predicted for the entire one-second integration interval using the best estimate of the navigation state vector solution form the previous epoch interval and the $\Delta V$ and $\Delta\theta$ from the IMU. This residual error vector from the Kalman prefilter 46 contains pseudorange, pseudorange rate, pseudorange acceleration and TEC error estimations that summarizes all the data integrated over the one-second interval and is therefore more accurate and robust than any individual measurement of a conventional real time tracking loop. The true pseudorange, pseudorange rate, pseudorange acceleration and TEC errors covariance of the Kalman prefilter output vector can also be more accurately determined by evaluation of the post fit measurement residuals. The cross correlation coefficients of the measurement errors are also available for use by the integration Kalman filter 48 to optimally process the residual pseudorange, pseudorange rate and pseudorange acceleration, and TEC error vector from the Kalman prefilter 46.

The Kalman prefilter 46, in the single frequency embodiment, includes a single frequency measurement model 72, a single frequency dynamic process model 74, and a single frequency error converter 76 for providing single frequency outputs 78, when processing I and Q samples respecting a single GPS frequency to indicating either L1 or L2 by way of example. The Kalman prefilter 46, in the dual frequency embodiment, includes a dual frequency measurement model 82, a dual frequency dynamic process model 84, and a dual frequency error converter 86 for providing dual frequency outputs 78, when processing I and Q samples respecting two single GPS frequencies f1 and f2 indicating L1 and L2 GPS frequencies by way of example. The error converters 76 and 86 convert estimated phase errors $\phi$ into pseudorange range errors $\Delta\rho$ and ionospheric errors $\Delta TEC$ as inputs to the integration Kalman filter 48. The $\Delta TEC$ and $\Delta \dot{TEC}$ errors from the prefilter 46 can be used to correct the ionospheric compensation model used in the integration Kalman filter 48.

The first term $\dot{\phi}$ in the $\Phi$ equation of the models 74 and 84 accounts for the effect of the predicted navigation state vector solution error and the second term comprising $\Delta \dot{TEC}$ accounts for the carrier phase advance due to a changing TEC. The first term $\dot{\phi}$ in the $\Delta\dot\rho$ equation accounts for the common errors between the code and carrier errors due to the predicted navigation state vector solution error and the second term comprising $\Delta \dot{TEC}$ accounts for the group delay due to TEC changes. The $\Delta TEC$ is the error in TEC and can be applied to an ionospheric correction model in the integration Kalman filter 46 to obtain more accurate ionosphere corrections. The observability of the time derivative of the TEC error originates from four sources, namely the code and carrier received signals on both L1 and L2 frequencies. The $\Delta TEC$ term does not explicitly appear in either the dynamic model or the measurement model. Only the TEC error derivative $\Delta \dot{TEC}$ is present in the process models 74 and 84 because the range and phase error inputs to the observation equations of the measurement models 72 and 82 are also functions of $\Delta TEC$. In general, the errors in range and phase can be modeled as indicated in the $\Delta\rho 1$, $\Delta\rho 2$, $\Phi 1$ and $\Phi 2$ observation equations in the measurement models 72 and 82. The second terms with $\Delta \dot{TEC}$ in the $\Phi$ and $\Delta\dot\rho$ process model equations account for errors in the ionospheric compensation made in the integration Kalman filter 48. There is one estimate of $\Delta TEC$ for each satellite to account for variability in the ionospheric compensation for each satellite. Similarly, there is a $\Delta \dot{TEC}$ for each satellite in the dynamic process models 74 and 84 to account for ionospheric temporal variations, that is scintillation. With only one $\Delta TEC$ and one $\Delta \dot{TEC}$ estimate for both code and carrier signals on both frequencies, the accuracy of the estimate of the range and phase errors is improved because all common ionospheric errors are accounted for by respective error models.

Referring to all of the Figures, the ultratight method replaces the conventional code and carrier tracking loops with at least two federated Kalman filters that optimally process data from the IMU 18 preferably colocated and rigidly mounted with the GPS antenna 16 to minimize leverarm compensation errors, from the user reference oscillator 24 and from the signal correlator 40. The integration Kalman filter 48 performs conventional GPS and inertial processing and operates at conventional rates on the order of one hertz. The integration Kalman filter 48 uses measurements from N smaller Kalman prefilters 46, one for each satellite in view, which operate at high rates for processing higher rate I and Q sample data measurement for determining estimates of pseudorange, pseudorange rate, pseudorange acceleration, and TEC errors relative to the best prediction over the one-second interval of the integration Kalman filter 48. Replica signals for each of the satellite correlators 40 are generated from the best error estimates of the position, velocity, user clock phase, frequency and frequency drift, and satellite ephemerides that indicate the actual satellite position and velocity at transmission time as evaluated from the ephemerides within the GPS navigation message demodulated from the GPS samples 30.

The large integration Kalman filter 48 does not process absolute GPS pseudorange and pseudorange error measurements, which would normally be derived by strobing the conventional tracking loops. Instead, the correlated Is and Qs are used as measures of the errors in the predicted replica signals. The high-speed Kalman prefilter 46 processes the I and Q samples directly for estimating the pseudorange, pseudorange error, and carrier phase errors relative to the predicted state of the integration Kalman filter 48. The state vector of the high-speed Kalman prefilter 46 consists of the pseudorange error, the amplitude of the signal and the second order model of carrier phase errors using as input measurements the Is and Qs samples correlated from early, prompt and late replica signals and generated by the correlation of the replica signals with the incoming received GPS sample signals 30 from the respective satellites.

When the estimate of the navigation state vector solution output from 54 and 48 and ephemerides are perfect and there is no measurement noise, the replica signals would be identical to the incoming received signals. This perfect case would generate a zero error state vector because the predicted replica signals would agree perfectly with the received signals. When there are errors in the navigation state vector solution, the replica signals will not perfectly correlate with the received GPS sample signals 30. The pseudorange error vector from the Kalman prefilter 46 is generated using the I and Q sample measurements from the correlator 40. The generation of the I and Q samples is accomplished by correlating the early, prompt, and late versions of the replica signals with the incoming GPS received signals 30. The I and Q samples are used to provide a measure of the range and phase errors in the predicted navigation state vector solution. These range and phase errors are projected onto the line-of-sight of each satellite and are represented by the error state vector ESV. The error state vector ESV is a residual error vector of the integration Kalman filter 48 because the ESV reflects the observation errors introduced by the preceding errors in the error state vector estimate. The measurement error generation process of the Kalman prefilter 46 is similar to that used in conventional code and carrier tracking loops, but instead of using the early and late errors to drive the numerically controlled oscillators of the tracking loops, the errors from the correlators are present in the Is and Qs samples that are used to estimate the range and phase errors that are then applied directly to the integration Kalman filter 48 providing the measurement residual error state vector ESV.

One benefit of the ultratight method is the lack of the temporally-correlated tracking loop errors and the lack of dynamic stress errors and unwanted correlations that would otherwise result in inaccurate navigation state vector solutions and poor signal tracking. The ultratight method avoids unwanted correlations when the navigation state vector solution is used to generate the prompt replica signal. When the I and Q measurements are biased during ultratight coupling, the bias is present because the navigation state vector solution is biased, not because the tracking loop is in error. This bias in the I and Q measurements can be used by the integration Kalman filter 48 to estimate the state vector error that caused the bias. The ultratight coupling method samples all GPS I and Q measurement data without being constrained by real time operational limitations thereby avoiding the unwanted correlations of tracking loops. The ultratight coupling method, which is free of these unwanted correlations, can exploit all GPS measurements between integration Kalman filter epochs in near real time processing.

The two Kalman filters 46 and 48 function as federated Kalman filters. In the ultratight coupling method, the large lower-rate integration Kalman filter 48 can accommodate the lower frequency error models, such as position, velocity, attitude, user clock, and the inertial instrument error models. The higher rate information, such as the I and Q sampled outputs of the correlators 40, is processed by N separate residual Kalman pre-filters 46 and the resulting pseudorange and TEC error estimates are sent to the large integration Kalman filter 48 at a more relaxed rate of one hertz. The integration Kalman filter 48 can be designed essentially as those that are normally used in conventional GPS and inertial navigation systems with the direct use of measurement residuals from the Kalman prefilter 46 replacing the conventional tracking loop for determination of pseudorange and pseudorange rate errors. The high-rate Kalman prefilter 46 is preferably a recursive or a least squares batch processor that compresses all the high-rate measurement residuals at m hertz from all N satellites in view into one smoothed measurement residual vector that is processed by the integration Kalman filter 48 at the desired one hertz rate. To distribute processing and reduce the processing burden. The Kalman prefilter 46 is preferably N separate prefilters, one for each satellite in view, all processing I and Q samples concurrently. Because the prompt replica signal is generated from the best estimate of the navigation state vector solution of the integration Kalman filter 48 using current calibration-compensated data of the user's clock and IMU, the dynamic model for the Kalman filter 46 need not be any higher order than quadratic order over the relatively short periods of time between the integration Kalman filter one second epochs. The uniform data spacing and simple motion error model of the integration Kalman filter 48 make the range and range rate domain a natural coordinate system for use by the high-rate Kalman prefilter state vector.

Use of all the I and Q sample measurement data over the one second epoch interval has several benefits. A first benefit is the use of all I and Q sample measurements over the one-second time interval will improve the measurement accuracy relative to conventional tracking loops. If a conventional tracking loop bandwidth was relatively wide, the improvement factor would approach the square root of m. However, the improvement relative to conventional tracking loops will be somewhat less because there is also some measurement noise filtering in conventional tracking loops as well, so the amount of improvement will be somewhat less than the square root of m for realistic tracking loop bandwidths.

A second benefit is the realistic estimate of measurement noise that is possible by batch processing all the data and empirically determining an estimate of the measurement noise from the residuals. Another benefit of ultratight coupling method is that the true measurement noise variance from the innovation sequence and covariance matrix from the resulting Kalman pre-filter error analysis can be used by the large integration Kalman filter 48 for optimal processing without noise variance uncertainty.

Another benefit of the ultratight coupling method is the ability to determine the pseudorange acceleration from the processing of a full second of data. A pseudorange acceleration measurement is now possible due to the manner in which the observation residual buildup is generated and estimated from an entire second of accumulated I and Q samples using the ultratight method. The use of an entire second of data enables estimation of the pseudorange acceleration. The use of a pseudorange acceleration measurement has many benefits in the observability of user clock and IMU error instability without having to observe these errors through dynamic coupling into pseudorange and pseudorange rate measurements. With a pseudorange acceleration measurement, there is more direct measurement of pseudorange errors with increased observability enabling the use of lower quality clocks and IMUs with larger error instabilities.

The ultratight GPS and inertial navigation tracking method provides a high degree of robustness and immunity to jamming with improved accuracy over conventional tracking loops because the ultratight method uses all of the GPS measurement data between integration Kalman filter processing cycles with processing performed in near real time. The estimation of errors relative to a predicted trajectory generated from freshly estimated IMU errors provides an excellent basis for the estimation of systematic errors. Processing the data in near real time rather than at real time enables the use of coherent integration beyond the twenty-milliseconds data bit boundaries by allowing non-real-time data bit estimation.

The ultratight method enables the determination of data bits after being received without the need for a priori navigation message. The ultratight method processes data after being received by the Kalman prefilter. The Kalman prefilter processing affords the opportunity to decide after the fact whether a data bit changed or not for data bit correction. This data correction is accomplished by hypothesis testing the data after the data is collected. After bit synchronization has been performed, the time of the potential bit transition time is known. At the time of bit transition, the data is processed with both possible data bit possibilities as if it were the correct choice. At the end of the twenty-milliseconds interval, the output of the integrate-and-dump process of the Kalman prefilter is examined and the correct data value is then chosen. This data correction process can be a multiple stage process that considers several twenty-milliseconds spans of data. The decision space for the data bit sequence becomes a decision tree in this case and techniques such as dynamic programming can be used to determine the best data bit sequence. The only limitation in optimality is the amount of processing and storage that can be afforded. After the data bit decision is made, the correct measurement data is then selected and the rest discarded. The retained measurement data is concatenated with the previous twenty-milliseconds sample output as if the data bits were known at the time of reception. The net result is comparable to data stripping, but without prior knowledge of the data bits. This data stripping capability offers extremely high tolerance to interference and accuracy improvement.

The ultratight method can be applied to future GPS and inertial receivers that have severe interference rejection requirements and offers robust navigation operation in the presence of potential interference. In addition, the close relationship between redundant GPS measurements and the IMU in a tightly controlled algorithm enables superior integrity algorithms that use the IMU as well as GPS to detect and isolate satellite signal problems. Hence, the ultratight method has application to high integrity requirements, such as aircraft landing requirements.

The ultratight method can function with high quality IMUs and user clocks, but can be used in combination with lower quality instruments, such as Microelectromechanical systems and IMUs due to the short-term stability required to support the correlation process. The potential use of a pseudorange acceleration measurement can also provide improved information to observe clock and inertial instrument instabilities due to temperature and acceleration sensitivities.

The ultratight method takes advantage of federated Kalman filters, tightly coupling carrier and code tracking and navigation processes for improved tracking. In the preferred form, one partitioned Kalman prefilter receives I and Q measurements for pseudorange error estimation, and another integration Kalman filter generates navigation errors, with both the Kalman filters contained within a coupled tracking and navigation loop. Those skilled in the art can make enhancements, improvements, and modifications to the invention, and these enhancements, improvements and modifications may nonetheless fall within the spirit and scope of the following claims.

What is claimed is:

1. A method for carrier and code tracking of a received signal in a receiver, the received signal comprising a received carrier signal and a received code signal, the method comprising the steps of, demodulating the received signal with a carrier replica signal for generating a carrier demodulated received signal, correlating the carrier demodulated received signal with a code replica signal for providing output samples, residual prefiltering the output samples for estimating residual errors between the received and code replica signals and for providing residual error data, the residual prefiltering using a prefilter measurement model relating the output samples to residual state variables and a residual process model relating the residual state variables to the residual error data, integration filtering the residual error data for estimating an integration error vector, the integration filtering for estimating the integration error vector using an integration measurement model relating the residual error data to integration state variables and an integration process model relating the integration state variables to the integration error vector, carrier adjusting the replica carrier signal by the integration error vector for providing an adjusted replica carrier signal for demodulating the received signal, and code adjusting the replica code signal by the integration error vector for providing an adjusted replica code signal for correlating the received signal with the adjusted replica code signal for reducing the residual error data during residual prefiltering and for reducing the integration error vector during integration filtering.

2. The method of claim 1 wherein the residual prefiltering step is a Kalman residual prefiltering step, and the integration filtering step is a Kalman integration filtering step.

3. The method of claim 1 wherein the replica signal comprises early, prompt, and late replica signals and the output samples comprise I and Q early, prompt, and late replica signals.

4. The method of claim 1 wherein, the received signal comprises a plurality of received signals having respective carrier and code received signals, the replica code signal comprises a respective plurality of code signals, the replica carrier signal comprise a respective plurality of carrier signals, and the output samples comprises a respectively plurality of output samples, the residual prefiltering step comprises a respective plurality of residual prefiltering steps each respectively sampling the respective plurality of output samples, and the residue error data comprises a plurality of residual error data for each of the respective plurality of residual prefiltering step.

5. A method for carrier and code tracking of a received signal in a receiver, the received signal comprising a received carrier signal and a received code signal transmitted from a transmitter at a range from the receiver, the received signal communicating ephemeris data from the transmitter, the receiver receives inertial data from an inertial measurement unit coupled to the receiver, the method comprising the steps of, receiver demodulating the received signal with a carrier replica signal for generating a carrier demodulated received signal, correlating the carrier demodulated received signal with a code replica signal for providing output samples, residual prefiltering the output samples for estimating residual errors between the received and code replica signals and for providing residual error data, the residual prefiltering using a prefilter measurement model relating the output samples to residual state variables and a residual process model relating the residual state variables to the residual error data, integration filtering the residual error data for estimating a navigation error vector, the integration filtering for estimating the navigation error vector using an integration measurement model relating the residual error data to integration state variables and an integration process model relating the integration state variables to the navigation error vector, navigation computing navigation position and velocity data from the inertial data and from the navigation error vector, ephemeris demodulating the received signal into the ephemeris data, ephemeris computing transmitter position and velocity data from the ephemeris data, range computing pseudorange data and pseudorange rate data from the navigation position and velocity data and from the transmitter position and velocity data, carrier adjusting the replica carrier signal by the pseudorange rate data for providing an adjusted replica carrier signal for demodulating the received signal, and code adjusting the replica code signal by the pseudorange data for providing an adjusted replica code signal for correlating the received signal with the adjusted replica code signal for reducing the residual error data during residual prefiltering and for reducing the estimated navigation error vector during integration filtering.

6. The method of claim 5 wherein,
the residual prefiltering step is a Kalman prefiltering step,
the integration filtering step is a Kalman filtering step,
the replica signal comprises early, prompt, and late replica signals,
the output samples are I and Q early, prompt and late replica signals
the received signal comprises a plurality of received signals having respective carrier and code received signals,
the replica code signal comprises a respective plurality of code signals,
the replica carrier signal comprise a respective plurality of carrier signals,
the output samples comprises a respectively plurality of output samples,
the residual prefiltering step comprises a respective plurality of residual prefiltering steps each respectively sampling the respective plurality of output samples, and
the residual error data comprises a plurality of residual error vectors for the respective plurality of residual prefiltering steps.

7. The method of claim 5 wherein the transmitter is a satellite transmitter.

8. The method of claim 6 wherein,
the correlating step integrates the output samples over a correlation time period for providing the prefiltering step the output sample at a high rate,
the residual prefiltering step provides the residual errors at a low rate,
the integration filtering step provides the navigation error vector at the low rate,
the navigation computing of the navigation position and velocity data is at a navigation update rate,
the ephemeris computing of the ephemeris position and velocity data is at an ephemeris data update rate,
the code and carrier adjusting of the code and carrier replica signals are at a replica update rate.

9. The method of claim 6 wherein navigation computing step comprises the step of receiving changes in velocity and attitude data for the navigation computing of the navigation position and velocity data.

10. The method of claim 6 wherein,
the received signals comprise f1 and f2 received signals,
the demodulating steps comprises an f1 demodulating step and a f2 demodulating step,
the correlator step comprises a f1 correlator step and a f2 correlator step for respective providing f1 and f2 output samples for the respective f1 and f2 received signals, and
the residual prefiltering step for receiving the f1 and f2 output samples and for providing the residual error data to the integration filtering step, the residual measurement model and the residual process model operates on both f1 and f2 output samples to provide the residual error data, the residual and measurement models serving to combine respective residual errors data from the f1 and f2 output samples into the residual error data, residual error data is a residual error vector comprising at least one single error calculated using the residual and measurements model operating on both of the f1 and f2 output samples.

11. The method of claim 6 wherein the residual error data is a vector comprising pseudorange, pseudorange rate, pseudorange acceleration, total electron content, and total electron content rate errors.

12. The method of claim 11 wherein the residual error vector further comprises a covariance matrix of uncertainties of the errors in the pseudorange, pseudorange rate, pseudorange acceleration, total electron content, and total electron content rate.

13. A method for carrier and code tracking of received signals in a receiver, the received signals each comprising a received carrier signal and a received code signal transmitted, each of the received signals are transmitted from a plurality satellite transmitters at respective ranges from the receiver, the received signals communicating respective ephemeris data from each of the satellite transmitters, the receiver receives inertial data from an inertial measurement unit coupled to the receiver, the method comprising the steps of, carrier demodulating the received signals with carrier replica signals for generating respective carrier demodulated received signals, correlating each of the carrier demodulated received signals with respective code early, prompt, and late replica signals for providing respective I and Q early, prompt, and late output samples that are integrated over a high rate predetermined time period and repetitively provided at each high rate predetermined time period, residual prefiltering each of the respective I and Q early, prompt, and late output samples for estimating residual errors between the received and code replica signals and for providing respective residual error data, the residual prefiltering using a prefilter measurement model relating the output samples to residual state variables and a residual process model relating the residual state variables to the residual error data that is generated over a low rate predetermined time period and provided at each low rate time period, respective residual prefiltering providing respective residual error data, integration filtering the respective residual error data for estimating a navigation error vector every low rate predetermined time period, the integration filtering for estimating the navigation error vector using an integration measurement model relating the residual error data to integration state variables and an integration process model relating the integration state variables to the navigation error vector, navigation computing at a navigation update rate navigation position and velocity data from the inertial data and from the navigation error vector, ephemeris demodulating the received signal into the ephemeris data, ephemeris computing at an ephemeris update rate transmitter position and velocity data from the ephemeris data, pseudo computing at a replica update rate pseudorange data and pseudorange rate data from the navigation position and velocity data and from the transmitter position and velocity data, carrier adjusting at the replica update rate the replica carrier signal by the pseudorange rate data for providing an adjusted replica carrier signal for demodulating the received signal, and code adjusting at the replica update rate by the pseudorange data for providing an adjusted replica code signal for correlating the received signal with the adjusted replica code signal for reducing the residual error data during residual prefiltering and for reducing the estimated navigation error vector during integration filtering.

14. The method of claim 13 wherein the residual prefiltering step is a Kalman prefiltering step, and the integration filtering step is a Kalman filtering step.

15. The method of claim 13 wherein the respective plurality of received signals are modulated at differing frequencies.

16. The method of claim 13 wherein the inertial data are changes in the velocity and attitude of the receiver, and navigation computing step receives the inertial data at an inertial data update rate.

17. The method of claim of claim 16 wherein the high rate is fifty hertz, the low rate is one hertz, the navigation update rate is one hundred hertz, the ephemeris update rate is one hundred hertz, and the inertial data update rate is one hundred hertz.

18. The method of claim 17 wherein the residual error data comprises errors in pseudorange, pseudorange rate, pseudorange acceleration, total electron content, and total electron content rate.

19. The method of claim 18 wherein the residual error data further comprises a covariance matrix of uncertainties of the errors in the pseudorange, pseudorange rate, pseudorange acceleration, total electron content, and total electron content rate.

* * * * *